(12) United States Patent
Jeter

(10) Patent No.: US 7,051,904 B2
(45) Date of Patent: May 30, 2006

(54) PUMP WITH INTEGRAL FILTER FOR A HOT MELT ADHESIVE SYSTEM

(75) Inventor: David R. Jeter, Woodstock, GA (US)

(73) Assignee: Nordson Corporation, Westlake, OH (US)

( * ) Notice: Subject to any disclaimer, the term of this patent is extended or adjusted under 35 U.S.C. 154(b) by 424 days.

(21) Appl. No.: 10/266,229

(22) Filed: Oct. 8, 2002

(65) Prior Publication Data

US 2003/0080155 A1    May 1, 2003

Related U.S. Application Data

(60) Provisional application No. 60/345,958, filed on Oct. 29, 2001.

(51) Int. Cl.
    *B67D 5/058* (2006.01)

(52) U.S. Cl. .............................. 222/189.11; 222/146.5; 425/192; 210/130

(58) Field of Classification Search ........... 222/189.06, 222/189.11, 146.5, 325; 425/192; 210/130

See application file for complete search history.

(56) References Cited

U.S. PATENT DOCUMENTS

| 3,585,361 | A | | 6/1971 | Rosen et al. | |
|---|---|---|---|---|---|
| 3,815,788 | A | | 6/1974 | Reighard et al. | |
| 3,912,630 | A | * | 10/1975 | Reighard et al. | 210/130 |
| 4,485,941 | A | | 12/1984 | Frates et al. | |
| 5,061,170 | A | * | 10/1991 | Allen et al. | 425/197 |
| 5,456,828 | A | * | 10/1995 | Tersi et al. | 210/184 |
| 5,735,588 | A | | 4/1998 | Dittman et al. | 312/330 |
| 6,131,770 | A | * | 10/2000 | Allen | 222/55 |
| 6,155,806 | A | | 12/2000 | Andel | 417/523 |
| D462,738 | S | * | 9/2002 | Byerly | D23/209 |

FOREIGN PATENT DOCUMENTS

| EP | 0286065 | 10/1988 |
|---|---|---|
| FR | 2324904 | 4/1977 |

* cited by examiner

*Primary Examiner*—Melvin A. Cartagena
(74) *Attorney, Agent, or Firm*—Wood, Herron & Evans, L.L.P.

(57) ABSTRACT

An pump for use with a dispensing unit of a hot melt adhesive system includes a removable filter. The filter is coupled with a cartridge which is threaded into a chamber of the pump. The chamber is located between the inlet and outlet of the pump so that this portion of the flow path through the pump ensures passage of the hot melt adhesive through the removable filter. The pump provides convenient access to the filter for service and replacement.

5 Claims, 3 Drawing Sheets

PUMP WITH INTEGRAL FILTER FOR A HOT MELT ADHESIVE SYSTEM

CROSS-REFERENCE TO RELATED APPLICATIONS

This application claims the benefit of U.S. Provisional Application No. 60/345,958 filed on Oct. 29, 2001, and the disclosure of which is hereby incorporated by reference herein.

FIELD OF THE INVENTION

The present invention pertains to dispensing systems for dispensing flowable material, and more particularly to hot melt adhesive dispensing systems.

BACKGROUND OF THE INVENTION

Thermoplastic adhesives, otherwise known as "hot melt" adhesives have been widely used in industry for adhering many types of products. Hot melt adhesive dispensing systems generally include a dispenser coupled with one or more dispensing guns, heated hoses fluidly connected to the guns, and a dispensing unit for melting and supplying heated liquid adhesive to the guns through the heated hoses. The dispensing units of conventional hot melt adhesive systems include a tank, a heater, a pump, a pump manifold, and a controller. The heater is generally located in a base of the tank for melting and heating adhesive material received into the tank in solid or semi-solid form. The pump manifold has an inlet connected to the tank and has multiple outlet ports adapted for connection to the heated hoses.

After the adhesive material is melted and heated in the tank, a pump operatively coupled to the tank and the pump manifold pumps liquid adhesive from the tank, through the pump manifold and heated hoses to the dispensing guns. Typically, the guns are connected to their own manifold. The controller controls the power supplied to the tank heater and heated hoses to maintain the liquid adhesive at an appropriate viscosity and temperature, depending on the application. The controller is also used to control many other operations of the system.

In conventional dispensing unit designs, a filter is provided to capture particulate material which may be entrained in the liquid adhesive prior to supplying the adhesive to the dispensing gun manifold(s). Primarily, the filter prevents clogging of the system downstream, such as at the dispensing guns. The filter is generally located in the pump manifold so that it may be easily accessed for servicing or replacement. In some dispensing unit configurations access to the pump manifold is difficult, due to the position of the pump manifold or interference with hoses or other components, and it is therefore desired to locate the filter in a more convenient location while retaining the filter within the flow path of the liquid adhesive.

A need therefore exists for a dispensing unit of a hot melt adhesive dispensing system having a filter which is conveniently located for easy access and which can be utilized in arrangements where the manifold is difficult to access.

SUMMARY OF THE INVENTION

The present invention provides a pump containing a removable filter for use in a dispensing unit of a hot melt adhesive system. The removable filter is positioned between an inlet and an outlet of the pump to capture particles contained in the adhesive as the adhesive flows through the pump. The pump of the present invention therefore provides a configuration permitting ready access to the filter when it is used with dispensing units having a pump manifold that may not be readily accessible for servicing.

In one aspect of the invention, the filter is contained in a filter cartridge that is removable from the pump. In another aspect of the invention, a dispensing unit for use in a hot melt adhesive system includes a pump with a removable filter.

These and other features, advantages and objectives of the invention will become more readily apparent to those of ordinary skill in the art upon review of the following detailed description of the preferred embodiments, taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the details of the preferred embodiments.

DETAILED DESCRIPTION

Figure 1:
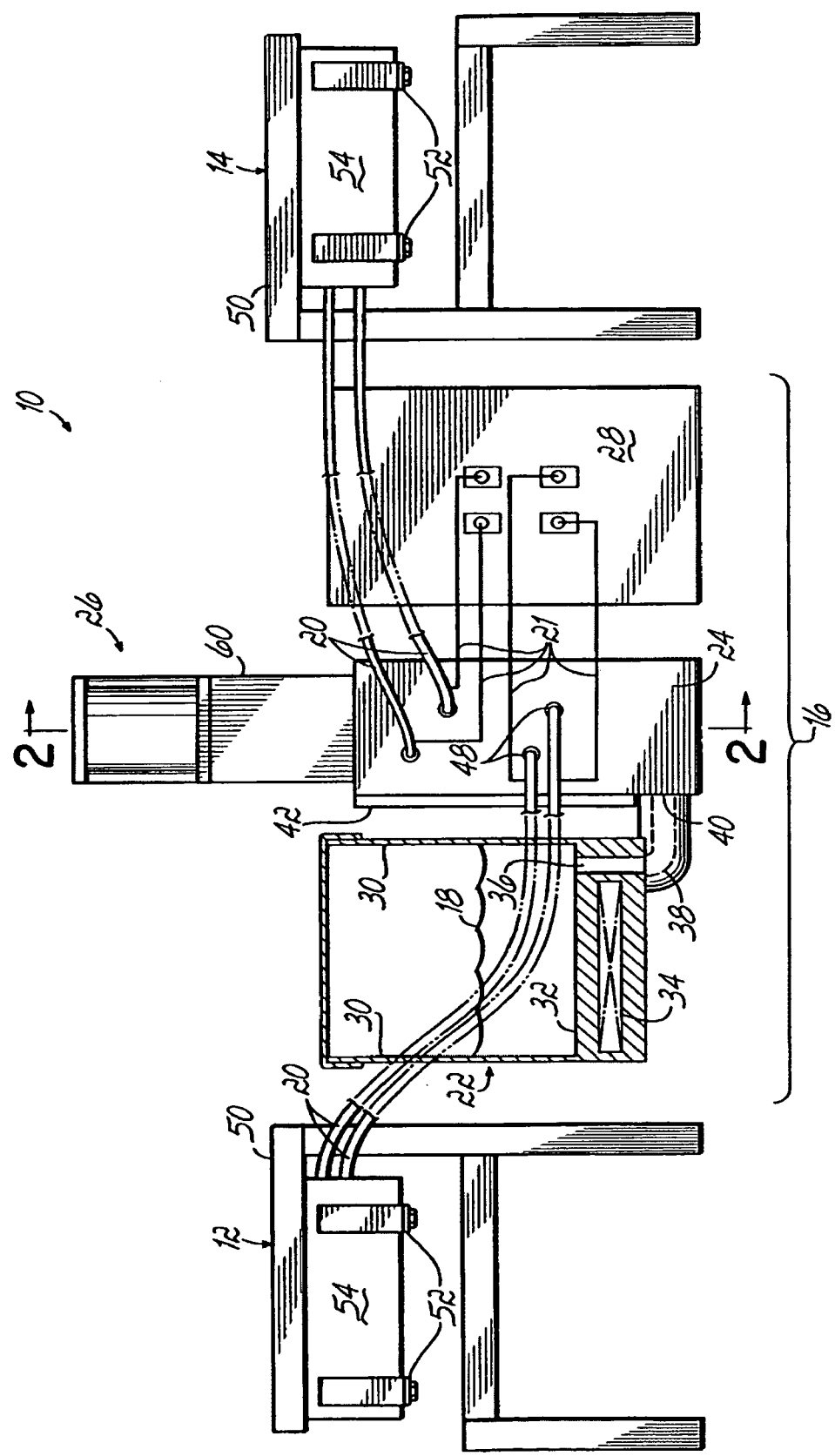
FIG. 1 is a schematic drawing of a hot melt adhesive system, including a dispensing unit having a pump according to the present invention.

Referring to FIG. 1, a hot melt adhesive system 10 includes a pair of adhesive guns 12, 14, a dispensing unit 16 for supplying adhesive 18 to the dispensers 12, 14, and heated hoses 20 connecting the dispensing unit 16 to the guns 12, 14. Cord sets 21 are used to heat and control the temperature of hoses 20 in a known manner. The dispensing unit 16 includes a tank 22 for receiving and melting hot melt adhesive 18, a manifold 24 in fluid communication with the tank 22, a pump 26 constructed according to the principles of the present invention and coupled to the manifold 24, and a controller 28. The tank 22 comprises side walls 30 and base 32 which includes a tank heater 34 for melting and heating the adhesive material 18 in the tank 22. A tank outlet 36 proximate the base 32 is coupled to a passage 38 which connects to an inlet 40 of the manifold 24.

Figure 2:
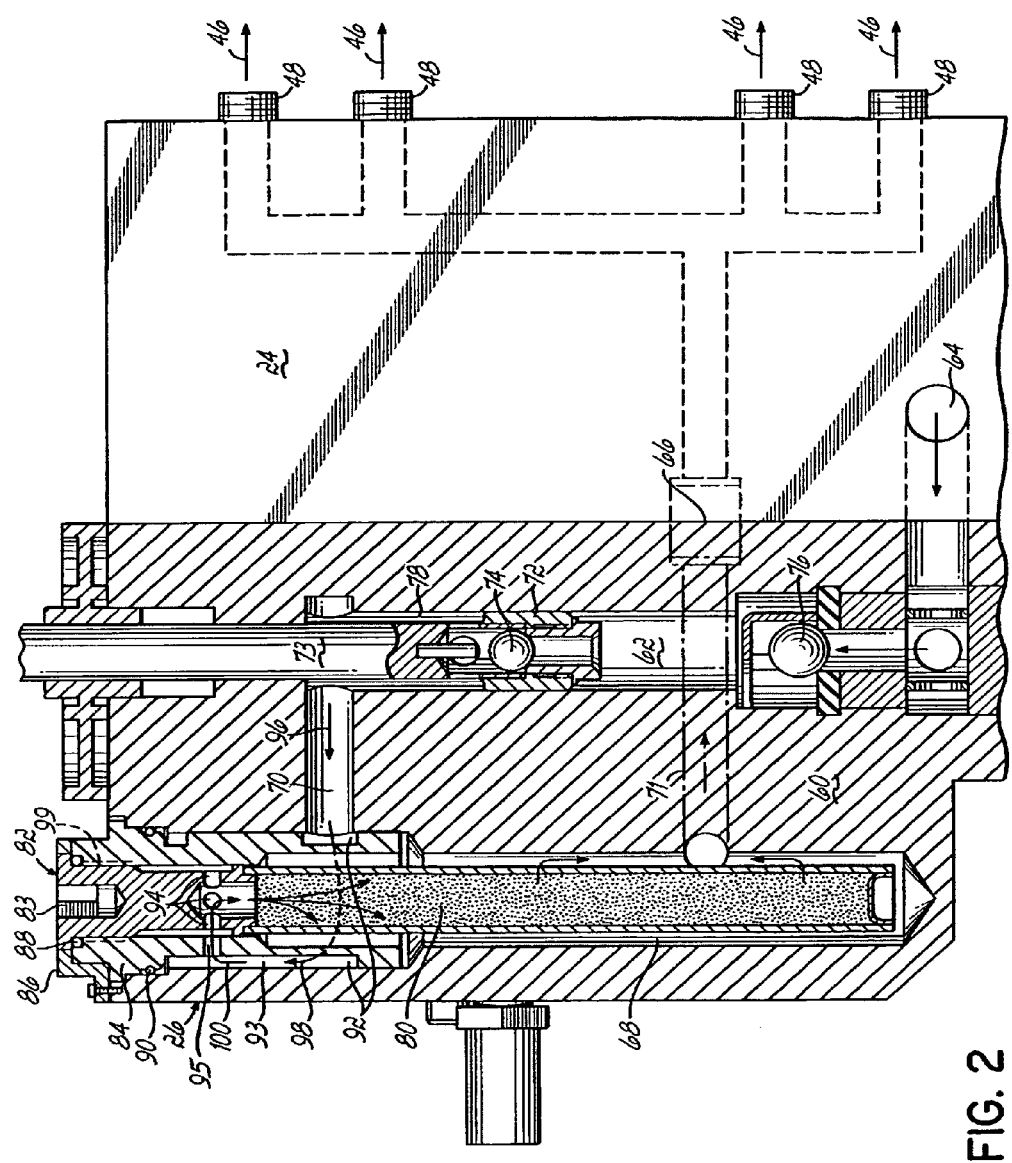
FIG. 2 is a sectional view of the pump manifold and pump of FIG. 1, partially fragmented and taken along line 2—2 to illustrate inner details of the preferred pump and removable filter.

The manifold 24 is located adjacent the tank 22 and includes a manifold heater 42 that is separate from the tank heater 34 and which can be independently controlled by the controller 28. Referring further to FIG. 2, pump 26 is coupled to the manifold 24 and pumps liquid adhesive 18 from the tank 22, through a filter 80 removably disposed within the pump 26, and into the manifold 24. The manifold 24 splits the adhesive 18 into separate flows 46 and directs the flows 46 to a plurality of outlet ports 48. The plurality of outlet ports 48 are configured to be coupled to the heated hoses 20 whereby the liquid adhesive 18 is supplied to the guns 12, 14.

The guns 12, 14 may be mounted to a frame 50 and include one or more adhesive dispensing modules 52 which apply the adhesive 18 to a desired product (not shown). Modules 52 may be coupled to their own manifolds 54 for supplying adhesive, actuating air and process air thereto. The hot melt adhesive system 10 illustrates two gun manifolds 54 each supplied by a single hose 20, however, a second hose 20 is shown on each side of system 10 and may supply additional gun manifolds (not shown) located respectively behind manifolds 54. Other hot melt systems may have a single gun, or may have other guns and the guns may take on many different configurations, according to the particular adhesive dispensing requirements without departing from the scope of the present invention.

As further shown in FIG. 2, pump 26 has a housing 60 which includes a pumping chamber 62, an inlet 64 and an outlet 66 in fluid communication with the pumping chamber 62. The housing 60 further includes a filter chamber 68 disposed in the flow path between inlet 64 and outlet 66 and connected to the pumping chamber 62 by inlet passage 70. Filter chamber 68 is further connected to outlet 66 by outlet passage 71. A piston 72 is slidably disposed within the pumping chamber 62 and has a check valve 74 to restrict the flow of fluid across the piston 72 to move in only one direction. The inlet 64 also has a check valve 76 which only permits fluid to enter the pumping chamber 62.

In the exemplary pump of FIG. 2, as the piston 72 is urged in a direction toward the inlet 64 under the action of piston rod 73, the piston check valve 74 opens to permit fluid to pass to a first side 78 of the piston 72 and the inlet check valve 76 is closed to prevent fluid from exiting the pump 26 through the inlet 64. As piston 72 is urged in a direction away from the inlet 64, the piston check valve 74 closes to pump fluid proximate the first side 78 of piston 72 through inlet passage 70, filter chamber 68 and outlet passage 71, toward outlet 66 while inlet check valve 74 opens to admit more fluid into the pumping chamber 62. For a more detailed discussion of this general type of piston pump, reference is made to U.S. Pat. No. 6,155,806, owned by Nordson Corporation and the disclosure of which is incorporated herein by reference.

As shown in FIG. 2, a filter 80 is mounted to the housing 60 and is disposed within the filter chamber 68 between inlet passage 70 and outlet passage 71 such that particles contained in the fluid may be captured by the filter 80 prior to exiting the pump 26. In the exemplary embodiment shown, the filter 80 is constructed to be contained in a cartridge 82 that is removable from the pump housing 60 for cleaning or replacement. Filter cartridge 82 is retained in filter chamber 68 by screwing the cartridge 82 into an adapter 84 by inserting a tool in an internal drive socket 83 and engaging threads 99. Adapter 84 is seated within pump housing 60 and held in place by clamp 86. Seal rings 88, 90 seal the filter cartridge 82 and adapter 84 to prevent leakage of adhesive 18 from the pump 26.

Adhesive 18 flows from inlet passage 70 into an annular passage 92 and connected passages 93, 95 around adapter 84 and into an end portion 94 of the filter 80 as indicated generally by arrows 96, 98, 100. Adhesive then flows radially outward through filter 80 into an annular portion of filter chamber 68, through outlet passage 71 and outlet 66, into the manifold 24, where the flow is split and directed to outlet ports 48 as described above. Any particulate material larger than the pore size of filter 80 will be trapped in filter 80. At desired time intervals, filter 80 may be easily accessed, removed and replaced by unscrewing cartridge 82. Filter 80 may be formed as a unit with cartridge 82 such that filter 80 and cartridge 82 are replaced simultaneously. As another alternative, filter 80 may be removed from cartridge 82 such as through a press fit connection so that cartridge 82 is reusable.

Figure 3:
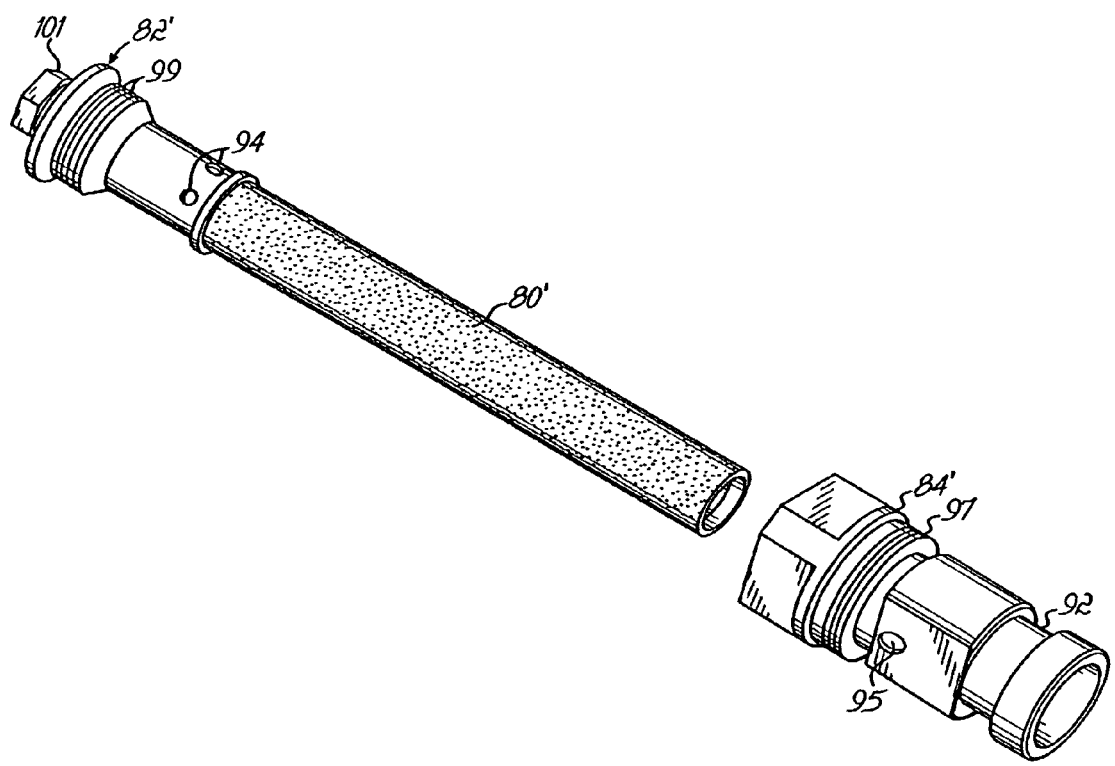
FIG. 3 is an exploded perspective view of an alternative embodiment of the removable filter.

FIG. 3 illustrates one alternative type of removable filter 80' contemplated by the invention. In this figure, reference numerals with prime marks (') refer to corresponding structure in FIG. 2 which has been slightly altered in this embodiment. Like reference numerals refer to like structure. In this embodiment, an upper end of filter 80' has been modified to include an external hex head 101 which is turned to engage threads 99 and an upper end of adapter 84' has been modified to include threads 97. Thus, instead of using a clamp arrangement as in the embodiment of FIG. 2, filter 80' is threaded into adapter 84' via threads 99 and adapter 84' is threaded into pump housing 60 via threads 97. A clamp or other type of anti-rotation plate or member may be engaged with adapter 84' to prevent it from rotating when unscrewing filter 80' using hex head 101. In all other significant respects, the function and operation of filter 80' is the same as discussed above with respect to FIG. 2.

While the present invention has been illustrated by the description of various embodiments thereof, and while the embodiments have been described in considerable detail, it is not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of Applicant's general inventive concept.

What is claimed is:

1. A hot melt adhesive dispensing unit comprising:
   a tank having at least one side wall and a bottom collectively defining a tank interior for receiving hot melt adhesive;
   a tank heater associated with said tank for heating and melting the hot melt adhesive;
   a manifold having an inlet and an outlet, said inlet in fluid communication with said tank interior;
   a manifold heater thermally coupled with said manifold;
   a pump coupled to said manifold outlet for pumping liquid adhesive from said tank and through said manifold, said pump including a pump inlet, a pump outlet and a chamber between said pump inlet and said pump outlet; and
   a filter removably positioned in said chamber for capturing particulate material in the liquid adhesive as the adhesive flows from said pump inlet to said pump outlet.

2. The dispensing unit of claim 1, wherein the pump further includes a housing and a piston slidably disposed within said housing such that motion of said piston draws the liquid adhesive into said pump inlet and discharges the liquid adhesive from said pump outlet.

3. The dispensing unit of claim 2, wherein said filter is coupled to a cartridge that is removable from said pump housing.

4. The dispensing unit of claim 3, wherein said filter is removable from said cartridge.

5. The dispensing unit of claim 3, wherein said cartridge and said pump include respective threaded portions which are engageable with each other to allow coupling and decoupling of said cartridge and said pump.

* * * * *